(12) United States Patent  
Chiang

(10) Patent No.: US 10,262,511 B2  
(45) Date of Patent: Apr. 16, 2019

(54) MOBILE ELECTRONIC DEVICE FIXING MODULE

(71) Applicant: FLYTECH TECHNOLOGY CO., LTD, Taipei (TW)

(72) Inventor: Chih-Kuang Chiang, Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 379 days.

(21) Appl. No.: 15/366,664

(22) Filed: Dec. 1, 2016

(65) Prior Publication Data

US 2018/0122201 A1  May 3, 2018

(30) Foreign Application Priority Data

Oct. 28, 2016 (TW) .............................. 105216501 U

(51) Int. Cl.
| | |
|---|---|
| F16M 11/00 | (2006.01) |
| G08B 13/22 | (2006.01) |
| A45C 11/00 | (2006.01) |
| F16M 11/18 | (2006.01) |
| F16M 13/00 | (2006.01) |
| F16H 1/00 | (2006.01) |
| H01R 13/639 | (2006.01) |
| H01R 24/86 | (2011.01) |
| H04M 1/02 | (2006.01) |
| G08B 13/14 | (2006.01) |
| H04W 88/02 | (2009.01) |

(52) U.S. Cl.
CPC .............. *G08B 13/22* (2013.01); *A45C 11/00* (2013.01); *F16H 1/00* (2013.01); *F16M 11/18* (2013.01); *F16M 13/00* (2013.01); *G08B 13/1436* (2013.01); *H01R 13/639* (2013.01); *H01R 24/86* (2013.01); *H04M 1/02* (2013.01); *H04M 1/0277* (2013.01); *H04M 1/0297* (2013.01); *H04W 88/02* (2013.01)

(58) Field of Classification Search
CPC .................... A45C 2011/002; A45C 2011/003
See application file for complete search history.

(56) References Cited

U.S. PATENT DOCUMENTS 6,305,588 B1 * 10/2001 Michel ...................... A45F 5/02  
224/195  
9,592,871 B2 * 3/2017 Whitten ................ G06F 1/1656  
(Continued)

*Primary Examiner* — Amy J. Sterling  
(74) *Attorney, Agent, or Firm* — WPAT, PC

(57) ABSTRACT

A mobile electronic device fixing module includes a mobile electronic device and a base. The mobile electronic device includes an assembling interface and a first transmission terminal group. A ring-shaped groove is formed in the assembling interface. The base is assembled with the assembling interface. The base includes plural rotary fixing slices and a second transmission terminal group. The second transmission terminal group corresponds to the first transmission terminal group. When the base is assembled with the assembling interface and the plural rotary fixing slices are rotated, the plural rotary fixing slices are inserted into the ring-shaped groove to be in a locked state, or the plural rotary fixing slices are removed from the ring-shaped groove to be in an unlocked state. When the base is assembled with the assembling interface, the second transmission terminal group is electrically connected with the first transmission terminal group.

16 Claims, 12 Drawing Sheets

(56) References Cited

U.S. PATENT DOCUMENTS

| | | | |
|---|---|---|---|
| 9,869,423 B2* | 1/2018 | Khodapanah | F16M 13/02 |
| 2007/0212931 A1* | 9/2007 | Livingston | A45F 5/00 |
| | | | 439/501 |
| 2011/0043086 A1* | 2/2011 | Cui | G06F 1/1626 |
| | | | 312/293.3 |

* cited by examiner

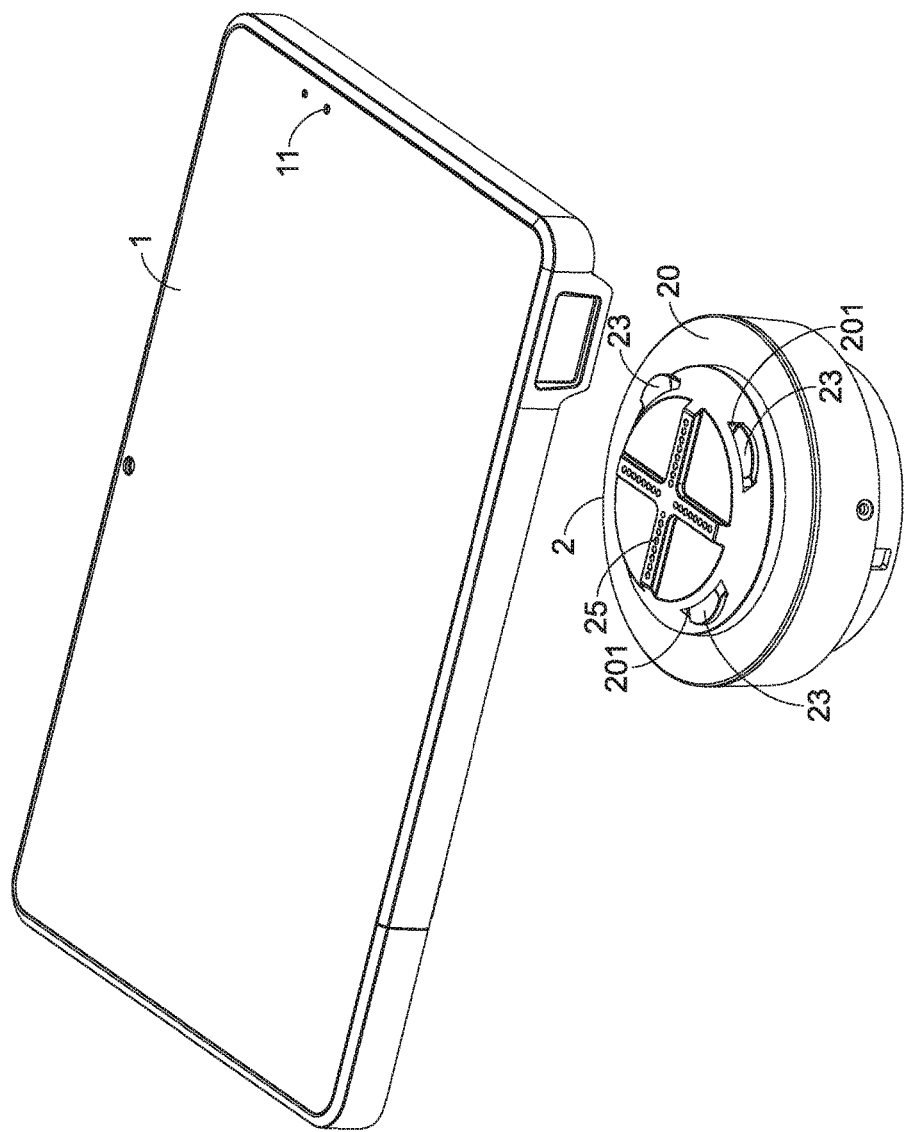

MOBILE ELECTRONIC DEVICE FIXING MODULE

FIELD OF THE INVENTION

The present invention relates to an electronic device fixing module, and more particularly to a mobile electronic device fixing module.

BACKGROUND OF THE INVENTION

With the advancement of mobile computing technologies and the development of wireless network technologies, various mobile electronic devices such as notebook computers, smart phones, tablet computers or personal digital assistants are widely used to implement required applications in our daily lives.

For providing information to be read or allowing the consumer to experience the actual operation, it is necessary to provide a display of the physical sample when this kind of electronic device is displayed in the exhibition or sold in the market. Since a large number of samples are displayed in an open environment, not only the trial counter display requirements but also the anti-theft requirements are worried by the exhibitors.

Nowadays, for displaying and exhibiting an electronic device, a display stand is placed on a counter and the electronic device is carried on the display stand. Generally, the display stand is equipped with adjustable coupling structures to fix the main body of the electronic device. In addition, a backside of the electronic device is glued on a part of the display stand through an adhesive.

Although the backside of the electronic device usually has a flat surface for facilitating the fixation through the adhesive, the adhesive unavoidably damages the backside material of the electronic device. Once the adhering efficacy of the adhesive loses or the adhesive is deliberately damaged, the anti-theft effect will be impaired. Moreover, although the coupling structures are able to increase the anti-theft effect without damaging the material of the electronic device, it is necessary to provide additional locking structures to lock the function of adjusting the coupling structures. In other words, the design of the conventional display stand is very complicated.

On the other hand, some electronic devices are designed for identifying persons in areas where access is controlled. These electronic devices are usually detachably disposed on the corresponding walls for maintenance purposes. However, if the electronic devices at the control side are improperly dismantled, a security problem occurs. Therefore, it is necessary to ensure that the electronic devices are securely and firmly set on the wall.

Moreover, if the existing design of the above related display stand needs to be connected to the utility power source, it is necessary to additionally provide a transmission wire to connect the display stand with the electronic device. If the transmission wire is not integrated in the display stand, the transmission wire is in a mess.

Therefore, there is a need of providing a novel fixing structure or locking mechanism to achieve the display and anti-theft purposes, security applications and power-supplying functions for electronic devices.

SUMMARY OF THE INVENTION

For solving the drawbacks of the conventional technologies, the present invention provides a mobile electronic device fixing module for achieving the display and anti-theft purposes.

In accordance with an aspect of the present invention, there is provided a mobile electronic device fixing module. The mobile electronic device fixing module includes a mobile electronic device and a base. The mobile electronic device includes an assembling interface and a first transmission terminal group. A ring-shaped groove is formed in the assembling interface. The base is assembled with the assembling interface. The base includes plural rotary fixing slices and a second transmission terminal group. The second transmission terminal group corresponds to the first transmission terminal group. When the base is assembled with the assembling interface and the plural rotary fixing slices are rotated, the plural rotary fixing slices are inserted into the ring-shaped groove to be in a locked state, or the plural rotary fixing slices are removed from the ring-shaped groove to be in an unlocked state. Moreover, when the base is assembled with the assembling interface, the second transmission terminal group is electrically connected with the first transmission terminal group. Consequently, an electric connection between the base and the mobile electronic device is established.

In an embodiment, the mobile electronic device further comprises a case and a first circuit board. The assembling interface is formed on the case. The first circuit board is disposed within the case and aligned with the assembling interface. The first transmission terminal group is disposed on the first circuit board. The first transmission terminal group is disposed within the assembling interface.

In an embodiment, the mobile electronic device further includes a vibration detector and a processing unit. The vibration detector is disposed on the first circuit board to detect vibration of the mobile electronic device. The processing unit is disposed on the first circuit board to drive rotation of the plural rotary fixing slices according to a detecting result of the vibration detector when the second transmission terminal group is electrically connected with the first transmission terminal group.

In an embodiment, the mobile electronic device further includes at least one first magnetic element, which is disposed within the assembling interface and aligned with the base. While the base is assembled with the assembling interface, the base is magnetically attracted and fixed by the at least one first magnetic element.

In an embodiment, the base further includes at least one second magnetic element, which is aligned with the assembling interface. While the base is assembled with the assembling interface, the assembling interface is magnetically attracted and fixed by the at least one second magnetic element.

In an embodiment, the mobile electronic device further includes an indication unit. The indication unit generates an indication information according to a rotation state of the plural rotary fixing slices when the second transmission terminal group is electrically connected with the first transmission terminal group.

In an embodiment, the base further includes a top cover, a motor and a rotating disc. The plural rotary fixing slices are pivotally coupled to an inner side of the top cover. The second transmission terminal group is protruded outside the top cover. The motor is connected with an external power source. The rotating disc is pivotally coupled to the top cover and linked with the motor. The rotating disc is driven by the motor to be rotated in a first rotation direction or a second rotation direction. The rotating disc is linked with the plural rotary fixing slices. When the rotating disc is rotated in the first rotation direction or the second rotation direction, the plural rotary fixing slices are correspondingly rotated so as to be inserted into or removed from the ring-shaped groove.

In an embodiment, the base further includes a second circuit board, a vibration detector and a processing unit. The second circuit board is located at an inner side of the rotating disc. The vibration detector is disposed on the second circuit board to detect vibration of the base. The processing unit is disposed on the second circuit board to drive rotation of the plural rotary fixing slices according to a detecting result of the vibration detector.

In an embodiment, external electric power from the external power source is provided to the mobile electronic device through the base when the second transmission terminal group is electrically connected with the first transmission terminal group.

In an embodiment, a first stopping structure and a second stopping structure are formed on the rotating disc to limit a rotating extent of the motor in the first rotation direction or the second rotation direction.

In an embodiment, the top cover includes plural slots corresponding to the plural rotary fixing slices, and the plural rotary fixing slices are selectively inserted into or removed from the ring-shaped groove through the plural slots.

In an embodiment, each of the plural rotary fixing slices includes a first end, a shaft and a second end. The first end is pivotally coupled to the top cover. The shaft is connected with the first end and aligned with a pivot center of the rotary fixing slice relative to the top cover. The second end is coaxially connected with the shaft and linked with the rotating disc. A radius of gyration of a first part of the first end is shorter than or equal to a distance between the shaft and the corresponding slot. Consequently, the first part is not protruded out of the corresponding slot when the first part is rotated to the corresponding slot. A radius of gyration of a second part of the first end is longer than or equal to the distance between the shaft and the corresponding slot. Consequently, the second part is protruded out of the corresponding slot when the second part is rotated to the corresponding slot.

In an embodiment, an inner surface of the rotating disc and the second end of the rotary fixing slice are saw-toothed structures that are engaged with each other. Consequently, the rotating disc and each rotary fixing slice are linked with each other.

In an embodiment, an application program is installed in the mobile electronic device. When the application program is executed to drive rotation of the plural rotary fixing slices, the plural rotary fixing slices are removed from the ring-shaped groove and in the unlocked state.

In accordance with another aspect of the present invention, there is provided a mobile electronic device for use with a base having plural rotary fixing slices. The mobile electronic device includes an assembling interface and a first transmission terminal group. The assembling interface is assembled with the base. The ring-shaped groove is formed in the assembling interface. The first transmission terminal group corresponds to a second transmission terminal group of the base. When the base is assembled with the assembling interface and the plural rotary fixing slices are rotated, the plural rotary fixing slices are inserted into the ring-shaped groove to be in a locked state, or the plural rotary fixing slices are removed from the ring-shaped groove to be in an unlocked state. Moreover, when the base is assembled with the assembling interface, the second transmission terminal group is electrically connected with the first transmission terminal group. Consequently, an electric connection between the base and the mobile electronic device is established.

In accordance with a further aspect of the present invention, there is provided a base for use with a mobile electronic device having a first transmission terminal group and an assembling interface to be assembled with the base. The base includes plural rotary fixing slices and a second transmission terminal group corresponding to the first transmission terminal group. When the base is assembled with the assembling interface and the plural rotary fixing slices are rotated, the plural rotary fixing slices are inserted into the ring-shaped groove to be in a locked state, or the plural rotary fixing slices are removed from the ring-shaped groove to be in an unlocked state. Moreover, when the base is assembled with the assembling interface, the second transmission terminal group is electrically connected with the first transmission terminal group. Consequently, an electric connection between the base and the mobile electronic device is established.

From the above descriptions, the present invention provides the mobile electronic device fixing module. The base is assembled with the mobile electronic device through the rotary fixing slices. Since the electric connection is established within the mobile electronic device and the base for transmitting signals and electric power, the transmission wire is no long in a mess during the electric connection. Moreover, an application program is executed to control the connection and the disconnection of the mobile electronic device and the base. Consequently, the display and anti-theft purposes of the mobile electronic device can be effectively achieved.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 3A is a schematic exploded view illustrating the mobile electronic device and the base and taken along a second viewpoint;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1A:
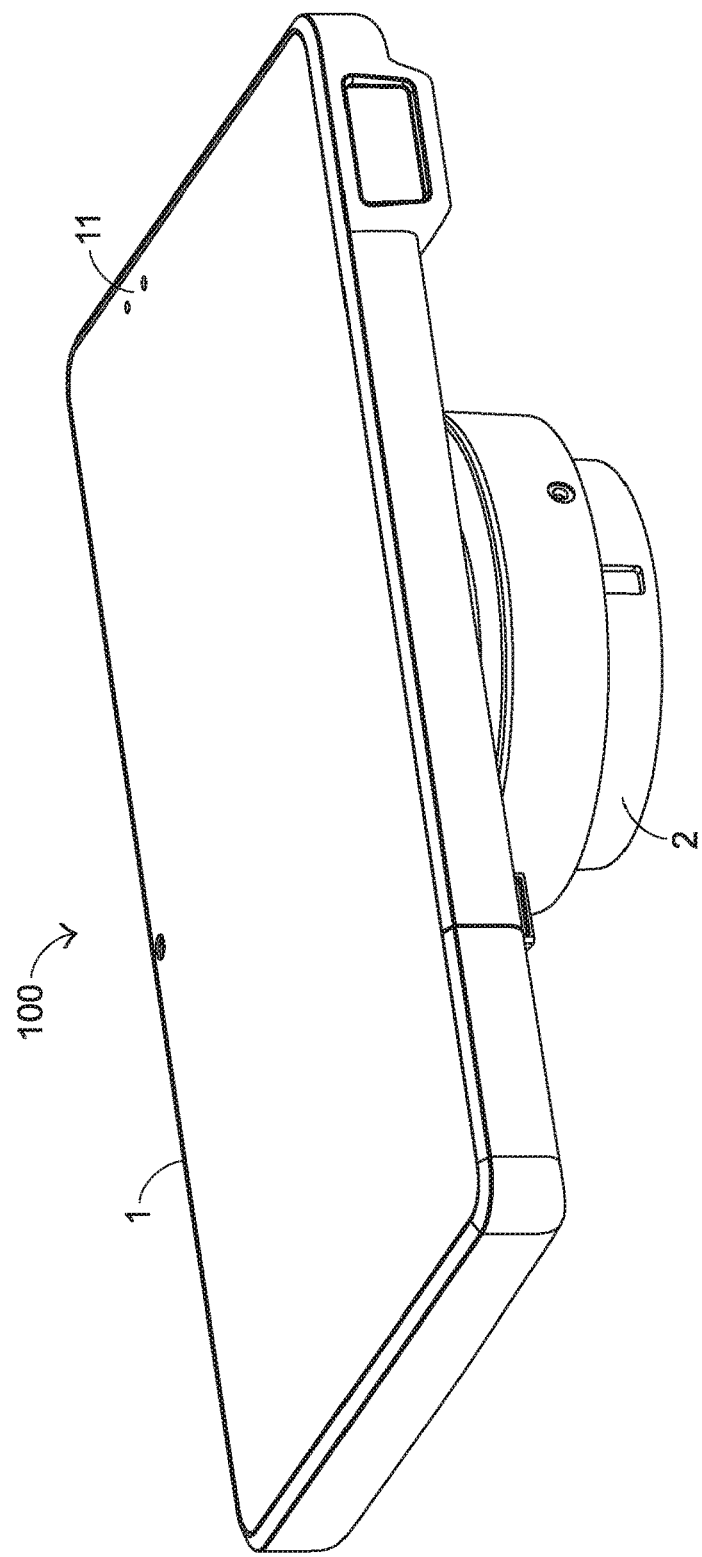
FIG. 1A is a schematic perspective view illustrating a mobile electronic device fixing module according to an embodiment of the present invention.
Figure 1B:
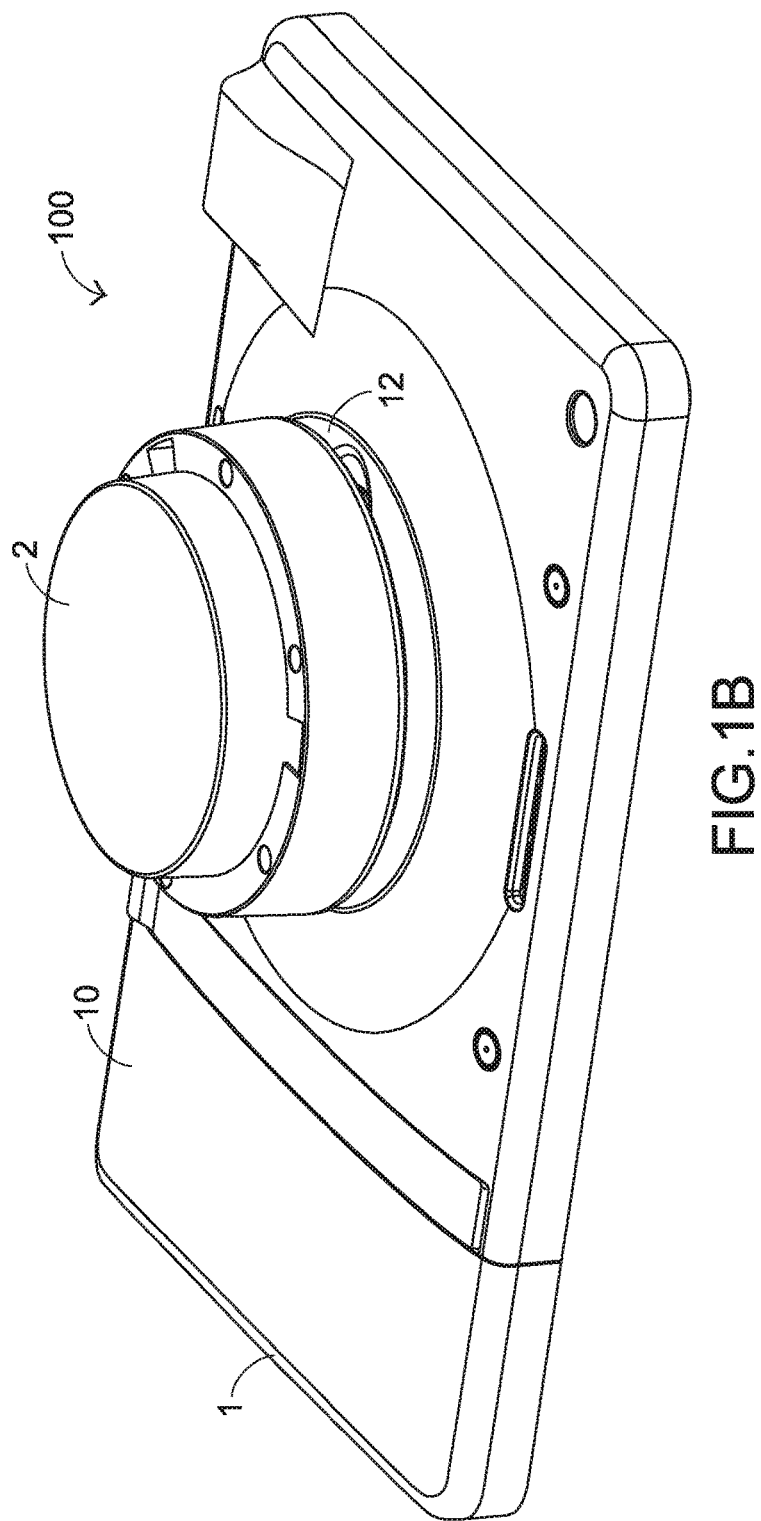
FIG. 1B is a schematic perspective view illustrating the mobile electronic device fixing module of FIG. 1A and taken along another viewpoint.

An embodiment of the present invention will be described as follows. Please refer to FIGS. 1A and 1B. FIG. 1A is a schematic perspective view illustrating a mobile electronic device fixing module 100 according to an embodiment of the present invention. FIG. 1B is a schematic perspective view illustrating the mobile electronic device fixing module 100 of FIG. 1A and taken along another viewpoint. As shown in the drawings, the mobile electronic device fixing module 100 comprises a mobile electronic device 1 and a base 2. The mobile electronic device 1 is assembled with and fixed on the base 2. When the mobile electronic device 1 is fixedly assembled with the base 2, the mobile electronic device 1 can be exhibited and displayed. Moreover, the base 2 of the present invention can further provide electric power to the mobile electronic device 1.

The mobile electronic device 1 is a smart phone, a tablet computer, a personal digital assistant or any other appropriate flat-type mobile electronic device. For assembling the mobile electronic device 1 in a specified manner, the structure of the mobile electronic device 1 is specially designed. Particularly, the mobile electronic device 1 and the base 2 are two independent devices. That is, the mobile electronic device 1 and the base 2 can be individually produced. However, the mobile electronic device 1 and the base 2 need to have the corresponding coupling relationships. In case that the mobile electronic device 1 uses the existing device, the existing device has to be modified in order to be coupled with the base 2 that has a specified assembling structure.

In this embodiment, the base 2 is assembled with the backside of the mobile electronic device 1 (see FIG. 1B), and the front side of the mobile electronic device 1 can still provide the touch control function (see FIG. 1A). The mobile electronic device 1 comprises a case 10 and an assembling interface 12. The assembling interface 12 is formed on the case 10. The base 2 is assembled with the assembling interface 12. Moreover, the mobile electronic device 1 further comprises an indication unit 11. For example, the indication unit 11 is like a power indication lamp of a general smart phone. The indication unit 11 is used for indicating the assembling condition of the mobile electronic device 1 and the base 2.

Figure 2A:
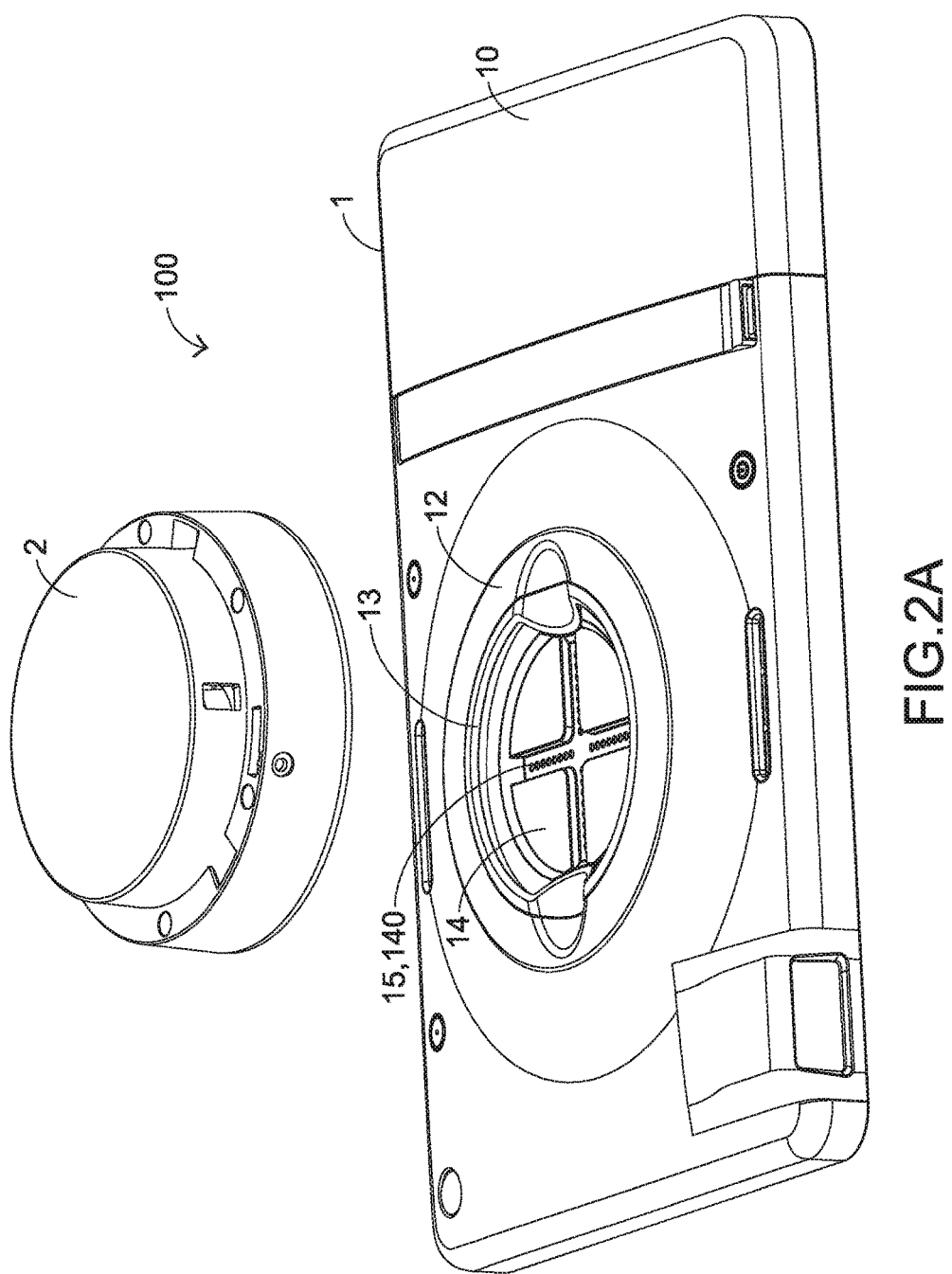
FIG. 2A is a schematic exploded view illustrating the mobile electronic device and the base and taken along a first viewpoint.
Figure 2B:
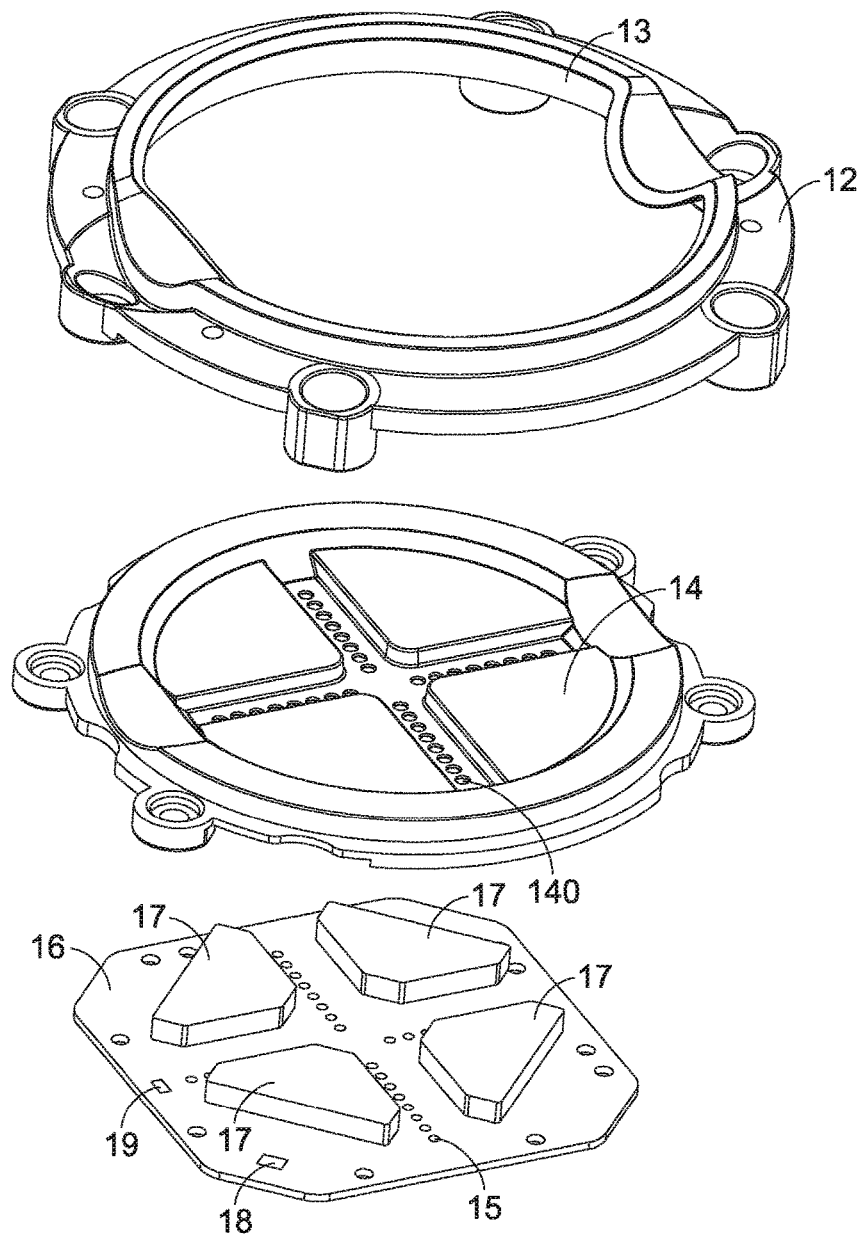
FIG. 2B is a schematic exploded view illustrating a portion of the mobile electronic device.
Figure 3B:
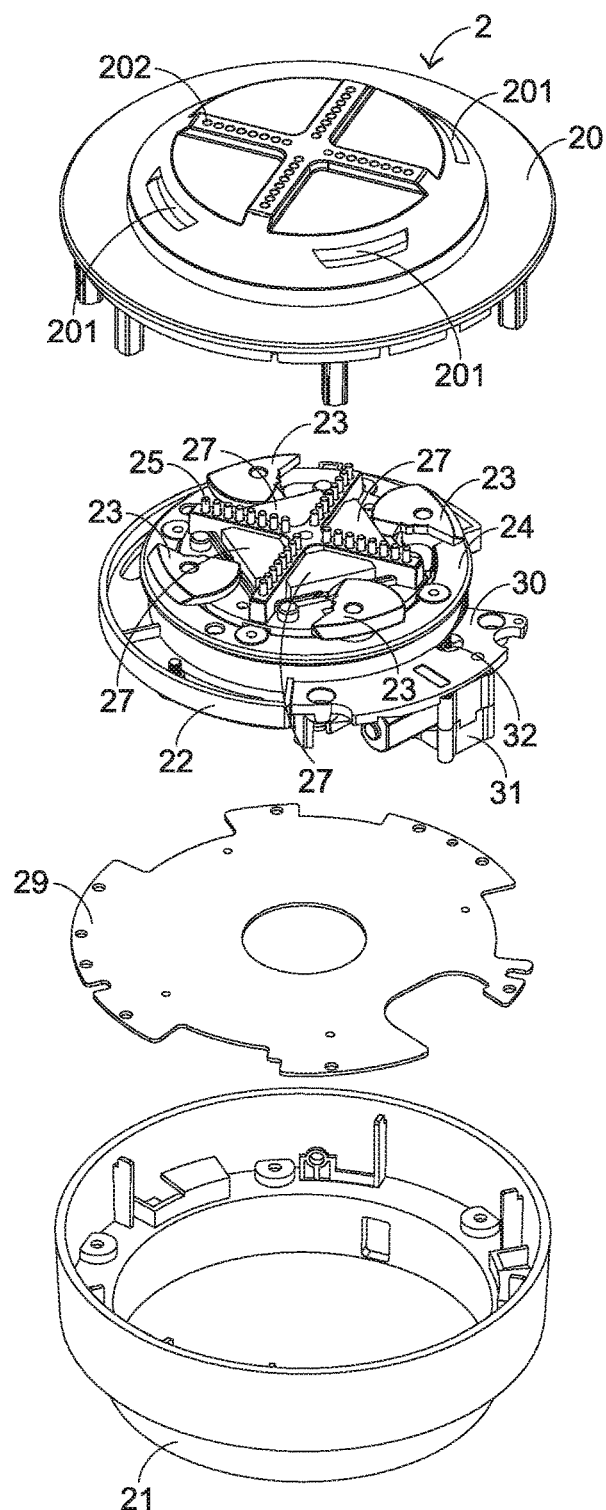
FIG. 3B is a schematic exploded view illustrating a portion of the base.
Figure 3C:
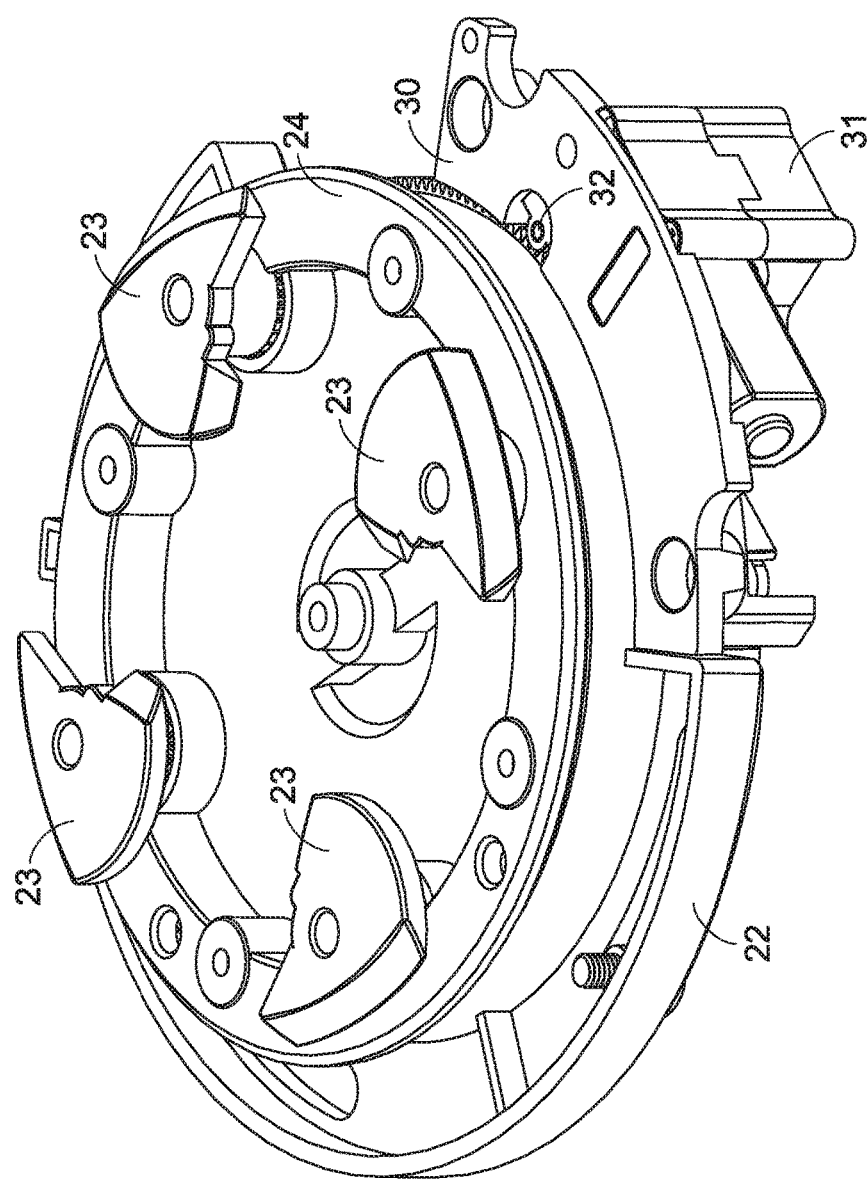
FIG. 3C is a schematic assembled view illustrating the base of FIG. 3B, in which some components are not shown.
Figure 3D:
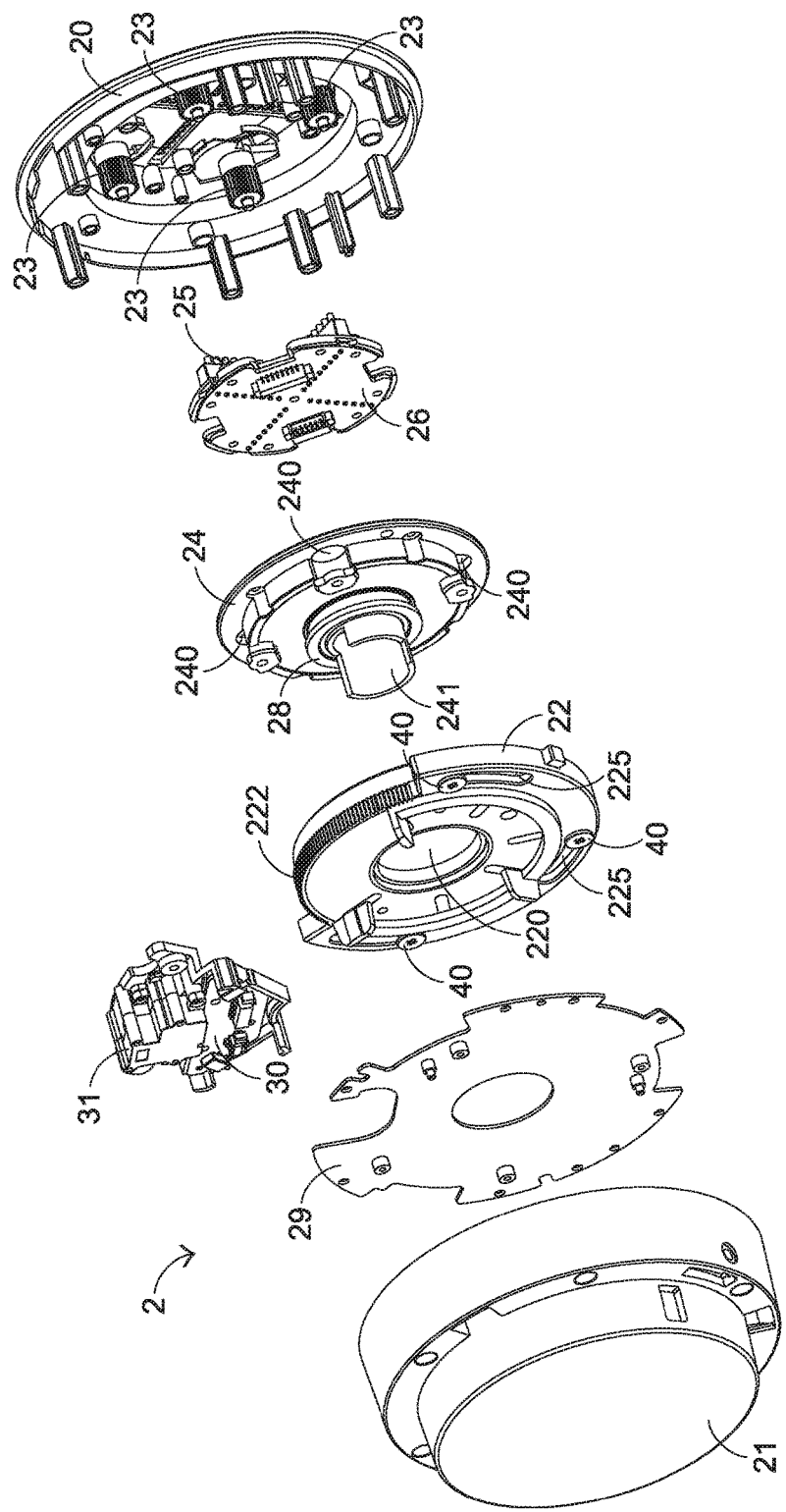
FIG. 3D is a schematic exploded view illustrating a portion of the base and taken along another viewpoint.

Please refer to FIGS. 2A, 2B, 3A, 3B, 3C and 3D. FIG. 2A is a schematic exploded view illustrating the mobile electronic device 1 and the base 2 and taken along a first viewpoint. FIG. 2B is a schematic exploded view illustrating a portion of the mobile electronic device 1. FIG. 3A is a schematic exploded view illustrating the mobile electronic device 1 and the base 2 and taken along a second viewpoint. FIG. 3B is a schematic exploded view illustrating a portion of the base 2. FIG. 3C is a schematic assembled view illustrating the base 2 of FIG. 3B, in which some components are not shown. FIG. 3D is a schematic exploded view illustrating a portion of the base 2 and taken along another viewpoint.

As shown in FIGS. 2A and 2B, the assembling interface 12 is substantially a ring-shaped structure. In addition, the assembling interface 12 is disposed within a circular opening of the case 10. The mobile electronic device 1 further comprises a first circuit board 16, a first transmission terminal group 15 and a covering plate 14. Moreover, a ring-shaped groove 13 is formed in the assembling interface 12.

As shown in FIGS. 3A~3D, the base 2 comprises plural rotary fixing slices 23, a second transmission terminal group 25, a base circuit board 26, a top cover 20, a rear cover 24, a fixation plate 29 and a bottom cover 21. The second transmission terminal group 25 corresponds to the first transmission terminal group 15. When the base 2 is assembled with the assembling interface 12, the second transmission terminal group 25 is electrically connected with the first transmission terminal group 15.

In this embodiment, the ring-shaped groove 13 is a recess or a seam between the assembling interface 12 and the covering plate 14. When the plural rotary fixing slices 23 of the base 2 are inserted into the ring-shaped groove 13, the plural rotary fixing slices 23 are fixed in the ring-shaped groove 13. More especially, the shape and size of the covering plate 14 match the assembling interface 12. After the assembling interface 12 is stacked on the assembling interface 12, the ring-shaped groove 13 is formed between a periphery of the covering plate 14 and the assembling interface 12.

It is noted that numerous modifications and alterations of the assembling interface 12 and the ring-shaped groove 13 may be made while retaining the teachings of the invention. For example, multi-layered concave and convex structures are formed on an inner periphery of the assembling interface, and the ring-shaped groove is formed between the concave and convex structures.

In this embodiment, the top cover 20 and the bottom cover 21 are combined together along a vertical direction in order to accommodate the other associated components within the space between them. The plural rotary fixing slices 23 are pivotally coupled to an inner side of the top cover 20. Moreover, the top cover 20 comprises plural slots 201 corresponding to the plural rotary fixing slices 23. The sizes and relative locations of these components are described as follows. When the base is assembled with the assembling interface 12, the plural slots 201 are aligned with the ring-shaped groove 13. In addition, the plural rotary fixing slices 23 are selectively inserted into or removed from the ring-shaped groove 13 through the plural slots 201.

Especially, the plural rotary fixing slices 23 can be rotated. In this embodiment, the base 2 comprises four rotary fixing slices 23. When the plural rotary fixing slices 23 are inserted into the ring-shaped groove 13 upon rotation of the plural rotary fixing slices 23, the plural rotary fixing slices 23 are fixed in the ring-shaped groove 13. When the plural rotary fixing slices 23 are removed from the ring-shaped groove 13 upon rotation of the plural rotary fixing slices 23, the plural rotary fixing slices 23 are not fixed in the ring-shaped groove 13. After the plural rotary fixing slices 23 are fixed in the ring-shaped groove 13, the base 2 is assembled with the assembling interface 12. After the plural rotary fixing slices 23 are not fixed in the ring-shaped groove 13, the base 2 is dismantled from the assembling interface 12.

Please refer to FIGS. 2A and 2B again. The first circuit board 16 is disposed within the case 10 and aligned with the assembling interface 12. The first transmission terminal group 15 is disposed on the first circuit board 16. The covering plate 14 is arranged between the assembling interface 12 and the first circuit board 16 in order to cover the first circuit board 16. The covering plate 14 comprises plural perforations 140. The terminals of the first transmission terminal group 15 are penetrated through the perforations 140 from the bottom side of the covering plate 14. Consequently, the first transmission terminal group 15 is disposed within the assembling interface 12.

Please refer to FIGS. 3B~3D again. The second transmission terminal group 25 is disposed on the base circuit board 26. The base circuit board 26 is disposed on the rear cover 24. In FIG. 3C, the base circuit board 26 is not shown. Consequently, the position of the rear cover 24 is exposed. The rear cover 24 is coupled upwardly with the top cover 20 without hindering the rotation of the rotary fixing slices 23. The top cover 20 comprises plural perforations 202. The terminals of the second transmission terminal group 25 are penetrated through the perforations 202. Consequently, the terminals of the second transmission terminal group 25 are protruded outside the top cover 20.

The profiles, arrangements or the terminal numbers of the first transmission terminal group 15 and the second transmission terminal group 25 may be varied according to the practical requirements. However, the first transmission terminal group 15 and the second transmission terminal group 25 need to have the functions of transmitting electric power and transmitting electric signals. In this embodiment, the terminals of the first transmission terminal group 15 and the second transmission terminal group 25 are metal pins. That is, the first transmission terminal group 15 and the second transmission terminal group 25 are transmission interfaces for electric transmission, including the transmission of electric power and the transmission of electric signals.

The mobile electronic device 1 further comprises one or more first magnetic elements 17. In this embodiment, the number of the first magnetic elements 17 is 4. These first magnetic elements 17 are disposed on the first circuit board 16, disposed within the assembling interface 12, and aligned with the base 2. While the base 2 is assembled with the assembling interface 12, the top cover 20 made of a paramagnetic material is magnetically attracted by the first magnetic elements 17. That is, the base 2 is guided in an assembling direction by the first magnetic elements 17. After the base 2 is assembled with the assembling interface 12, the base 2 is fixed on the assembling interface 12 through the magnetic attraction of the first magnetic elements 17.

Similarly, the base 2 further comprises one or more second magnetic elements 27. In this embodiment, the number of the second magnetic elements 27 is 4. These second magnetic elements 27 are disposed on the base circuit board 26 and aligned with the assembling interface 12. While the base 2 is assembled with the assembling interface 12, the covering plate 14 made of a paramagnetic material is magnetically attracted by the second magnetic elements 27. That is, the base 2 is guided in the assembling direction by the second magnetic elements 27. After the base 2 is assembled with the assembling interface 12, the base 2 is fixed on the assembling interface 12 through the magnetic attraction of the second magnetic elements 27.

In this embodiment, the first magnetic elements 17 and the second magnetic elements 27 are magnets, and the first magnetic elements 17 and the corresponding second magnetic elements 27 are magnetically attracted by each other. Since the magnets are included in the base 2 and the assembling interface 12, the guiding efficacy or the fixing efficacy is enhanced. On the other hand, the magnets may be included in either the base 2 or the assembling interface 12 as long as the guiding efficacy or the fixing efficacy is sufficient. That is, in some other embodiments, the mobile electronic device fixing module 100 is equipped with either the first magnetic elements 17 or the second magnetic elements 27. If the mobile electronic device fixing module 100 is equipped with the first magnetic elements 17 and the second magnetic elements 27, the surfaces of the first magnetic elements 17 and the second magnetic elements 27 with opposite poles face outside. Consequently, the first magnetic elements 17 and the corresponding second magnetic elements 27 can be magnetically attracted by each other.

Generally, the first transmission terminal group 15 and the second transmission terminal group 25 are precision components. If the applied force is improper during the assembling process, the terminals of the first transmission terminal group 15 and the second transmission terminal group 25 are possibly damages because of collision. Moreover, if the assembling angles are inclined during the assembling process, the rotary fixing slices 23 cannot be accurately inserted into the ring-shaped groove 13. For solving the above drawbacks, the mobile electronic device 1 further comprises a vibration detector 18 and a processing unit 19 for judging whether the assembling condition is suitable or not.

As shown in FIG. 2B, the vibration detector 18 and the processing unit 19 are disposed on the first circuit board 16. In the embodiment of FIG. 2B, the size or shape of the first circuit board 16 matches a polygonal shape of the assembling interface 12. It is noted that the size and shape of the first circuit board 16 are not restricted. In some other embodiments, the first circuit board 16 has a different design. Alternatively, the first circuit board 16 is integrated into a main circuit board of the mobile electronic device 1. Under this circumstance, the layout space of associated components in the case 10 is reduced, and thus the thickness or volume of the mobile electronic device 1 is decreased.

The vibration detector 18 is used for detecting the vibration of the mobile electronic device 1. When the electric connection between the second transmission terminal group 25 and the first transmission terminal group 15 is established, the processing unit 19 drives the rotation of the rotary fixing slices 23 according to the detecting result of the vibration detector 18. For example, once the applied force is very large to result in a lager vibration amount (e.g., larger than a threshold value) during the assembling process, the processing unit 19 will not issue a rotation signal to drive the rotation of the rotary fixing slices 23 even if the second transmission terminal group 25 and the first transmission terminal group 15 are contacted with each other.

Moreover, the base 2 is electrically connected with an external power source through an associated transmission wire. The external power source and the transmission wire are not shown in FIGS. 1A~3D. After the mobile electronic device 1 and the base 2 are assembled with each other, the electric connection between the second transmission terminal group 25 and the first transmission terminal group 15 is established. Consequently, external electric power from the external power source is provided to the mobile electronic device 1 through the base 2. Since the electric connection is established within the mobile electronic device 1 and the base 2, the transmission wire is no long in a mess during the electric connection.

Please refer to FIGS. 3B~3D again. The base 2 further comprises a motor 31, a second circuit board 30 and a rotating disc 22. The motor 23 is used for driving rotation of the rotating disc 22, thereby rotating the rotary fixing slices 23. As mentioned above, the rear cover 24 is coupled upwardly with the top cover 20 without hindering the rotation of the rotary fixing slices 23. Particularly, the rear cover 24 is not rotated. However, the rear cover 24 is acted as a pivot shaft of the rotating disc 22. The motor 31 is electrically connected with the external power source to provide a driving force. The rotating disc 22 is pivotally coupled to the top cover 20 and linked with the motor 31. Consequently, the rotating disc 22 is driven by the motor 31.

Moreover, the rear cover 24 comprises a bearing 241, and the rotating disc 22 comprises a pivot hole 220. After the bearing 241 is inserted into the pivot hole 220 of the rotating disc 22, the rotating disc 22 is sheathed around the bearing 241 and then the bearing 241 is fixed on the bottom cover 21. Preferably, the bearing 241 further comprises a stopping ring 28 corresponding to the pivot hole 220. The stopping ring 28 is made of a special material such as copper or other metallic material. The stopping ring 28 is filled in the gap between the pivot hole 220 and the bearing 241 to support the rotating disc 22 and avoid detachment of the rotating disc 22. Consequently, the rotating disc 22 can be smoothly rotated on the bearing 241.

Moreover, plural hollow guiding tracks 225 are formed in the rotating disc 22. In addition, plural guiding posts 40 that are fixed on the top cover 20 are movably disposed within the corresponding guiding tracks 225. Consequently, the rotating disc 22 can be rotated more stably. Moreover, the rear cover 24 further comprises plural aperture seats 240 corresponding to the plural rotary fixing slices 23. The plural rotary fixing slices 23 are pivotally coupled to the plural aperture seats 240 and the top cover 20. Moreover, the plural rotary fixing slices 23 are linked with the rotating disc 22 through the plural aperture seats 240.

After the rotating disc 22 is sheathed around the bearing 241, the motor 31 and the second circuit board 30 on fixed on the bearing 241 and the fixation plate 29. Moreover, the motor 31 and the second circuit board 30 are located at an inner side of the rotating disc 22 and fixed in the bottom cover 21. The second circuit board 30 does not hinder the rotation of the rotating disc 22. However, the second circuit board 30 is electrically connected with the base circuit board 26 through another conductive wire (not shown) in order to receive the driving signal. After the conductive wire is electrically connected to an edge of the second circuit board 30, the conductive wire is penetrated through the hollow part of the bearing 241 and electrically connected to a backside of the base circuit board 26. Consequently, the rotation of the rotating disc 22 is not adversely affected by the wiring method of the conductive wire.

Figure 4A:
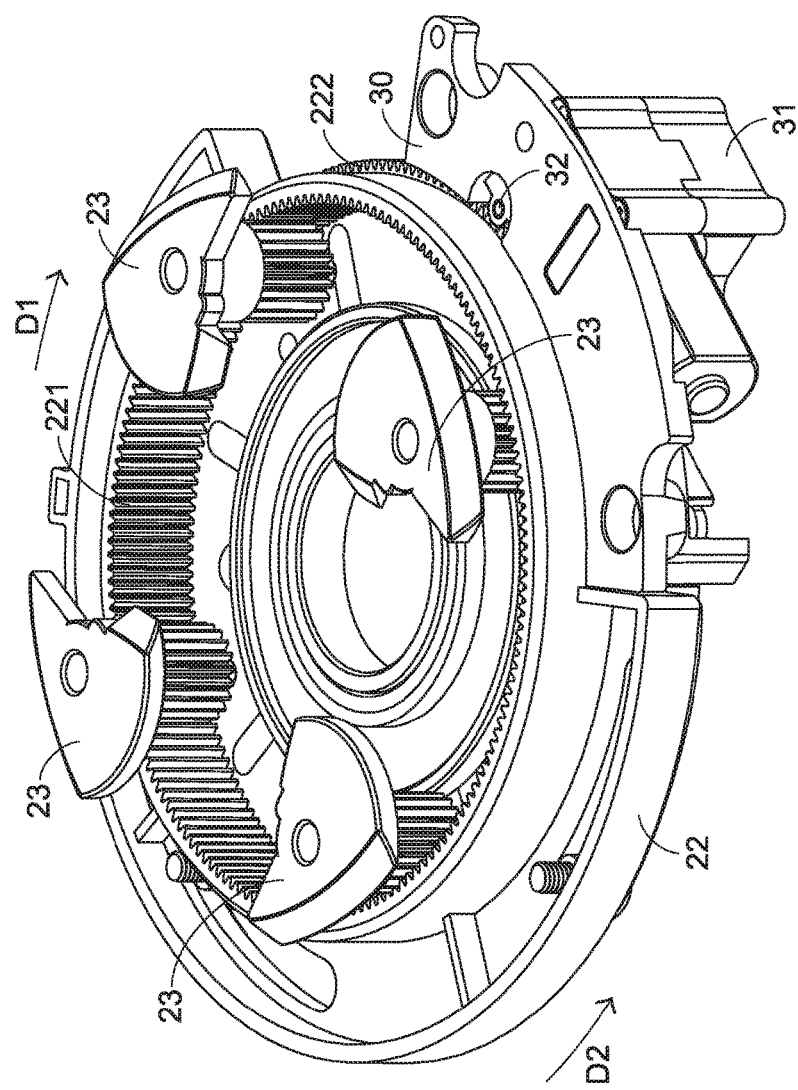
FIG. 4A is a schematic assembled view illustrating the base of FIG. 3C, in which some components are not shown.
Figure 4B:
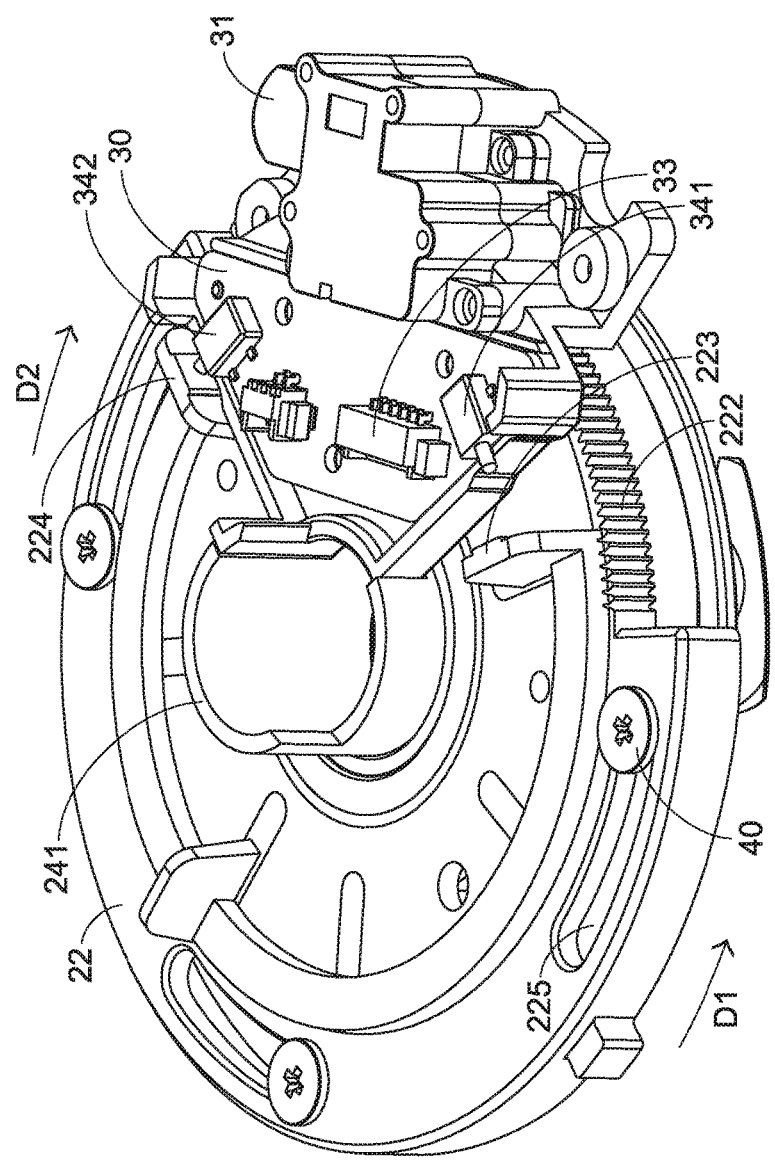
FIG. 4B is a schematic perspective view illustrating a portion of the upside-down structure of FIG. 3B.
Figure 4C:
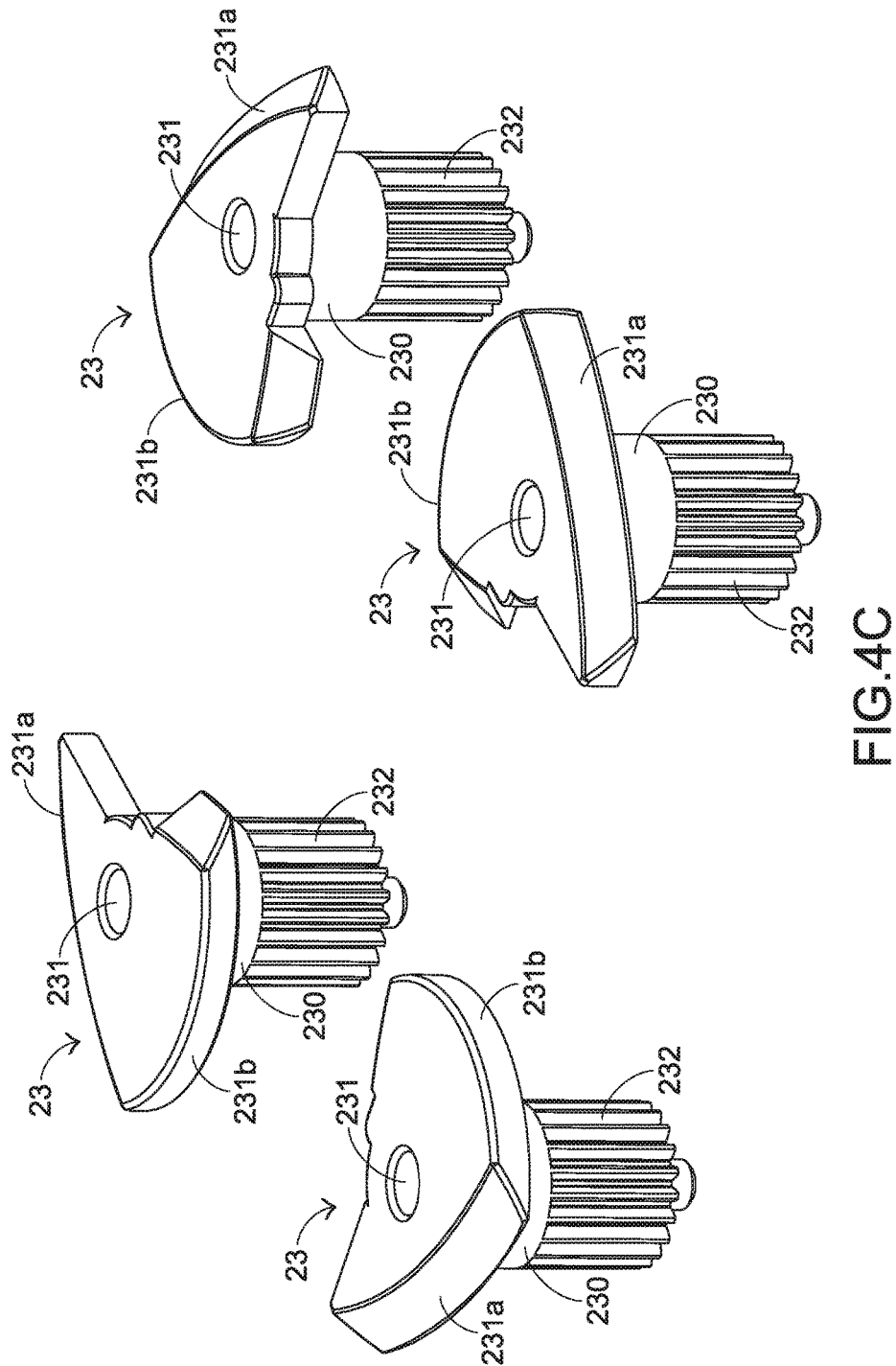
FIG. 4C is a schematic enlarged perspective view illustrating the plural rotary fixing slices.

Please refer to FIGS. 4A, 4B and 4C. FIG. 4A is a schematic assembled view illustrating the base of FIG. 3C, in which some components are not shown. FIG. 4B is a schematic perspective view illustrating a portion of the upside-down structure of FIG. 3B. FIG. 4C is a schematic enlarged perspective view illustrating the plural rotary fixing slices 23.

In FIG. 4A, the rear cover 24 of the base 2 of FIG. 3C is not shown. An inner surface 221 and a lateral surface 222 of the rotating disc 22 have saw-toothed structures. When the motor 31 is enabled, a gear 32 is rotated to generate the driving force. The gear 32 is engaged with the lateral surface 222 of the rotating disc 22, and thus the gear 32 is linked with the rotating disc 22. As the gear 32 is rotated, the rotating disc 22 is correspondingly rotated.

As shown in FIG. 4C, each of the plural rotary fixing slices 23 comprises a first end 231, a shaft 230 and a second end 232. Moreover, the first end 231 is pivotally coupled to the top cover 20. The shaft 230 is connected with the first end 231 and aligned with a pivot center of the rotary fixing slice 23 relative to the top cover 20. The second end 232 is coaxially connected with the shaft 230. In addition, the second end 232 is linked with the rotating disc 22. Similarly, the second end 232 has the saw-toothed structures, which are engaged with the inner surface 221 of the rotating disc 22. As the rotating disc 22 is rotated, the corresponding rotary fixing slice 23 is rotated.

In an embodiment, the motor 31 is a stepper motor, and the gear 32 of the motor 31 can drive rotation in two directions in a reciprocating manner. As the rotating disc 22 is driven by the motor 31, the rotating disc 22 is rotated in a first rotation direction D1 (see FIG. 4A) or a second rotation direction D2 (see FIG. 4B). Consequently, the plural rotary fixing slices 23 are rotated in the opposite direction. For example, if the rotating disc 22 is rotated in the first rotation direction D1, the plural rotary fixing slices 23 are rotated in the second rotation direction D2. Whereas, if the rotating disc 22 is rotated in the second rotation direction D2, the plural rotary fixing slices 23 are rotated in the first rotation direction D1.

Moreover, as shown in FIG. 4C, the first end 231 of the rotary fixing slice 23 is substantially fan-shaped. That is, the first end 231 comprises a first part 231a and a second part 231b. The first part 231a and the second part 231b are asymmetric to each other. In the entire of the base 2, the radius of gyration of the first part 231a is shorter than or equal to the distance between the shaft 230 and the corresponding slot 201. When the first part 231a is rotated to the corresponding slot 201, the first part 231a is not protruded out of the slot 201. The radius of gyration of the second part 231b is longer than or equal to the distance between the shaft 230 and the corresponding slot 201. When the second part 231b is rotated to the corresponding slot 201, the second part 231b is protruded out of the slot 201.

For effectively controlling the protruded state or the retracted state of the first end 231 of each rotary fixing slice 23, it is necessary to control the arc length of the gear 32 to be rotated in the first rotation direction D1 or the second rotation direction D2. As shown in FIG. 4B, a first stopping structure 223 and a second stopping structure 224 are formed on the rotating disc 22. Moreover, a processing unit 33, a first tactile switch 341 and a second tactile switch 342. When the rotating disc 22 is rotated such that the first tactile switch 341 is pressed by the first stopping structure 223, the gear 32 is not rotated under control of the processing unit 33. Similarly, when the rotating disc 22 is rotated such that the second tactile switch 342 is pressed by the second stopping structure 224, the gear 32 is not rotated under control of the processing unit 33.

By the first stopping structure 223, the second stopping structure 224 and related circuitry design, the rotating extent of the motor 31 in the first rotation direction D1 or the second rotation direction D2 can be limited.

In accordance with the present invention, the first end 231 of the each rotary fixing slice 23 is selectively protruded or retracted when the rotating disc 22 is rotated in a specified rotation direction. That is, the rotating disc 22 is not over-rotated. If the rotating disc 22 is rotated in the specified rotation direction and first end 231 is protruded, the first end 231 will not be retracted in the specified rotation direction.

Similarly, if the rotating disc 22 is rotated in the specified rotation direction and first end 231 is retracted, the first end 231 will not be protruded in the specified rotation direction. Moreover, the arc length between the first stopping structure 223 and the first tactile switch 341 is equal to the arc length between the second stopping structure 224 and the second tactile switch 342. The arc length indicates the rotating extent for protruding or retracting the first end 231. Since the rotating conditions of the rotary fixing slices 23 can be effectively controlled, the gear 32 of the motor 31 is not damaged.

Figure 5A:
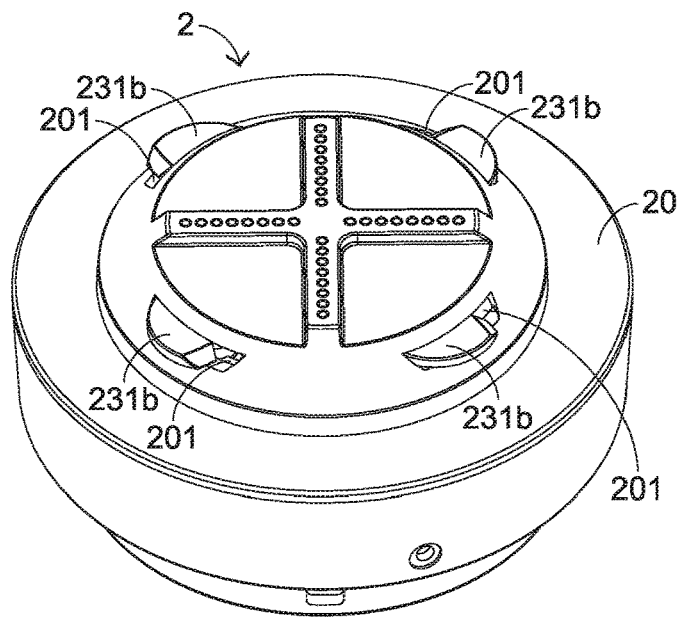
FIG. 5A is a schematic perspective view illustrating the base of the mobile electronic device fixing module, in which the plural rotary fixing slices are in a protruded state.
Figure 5B:
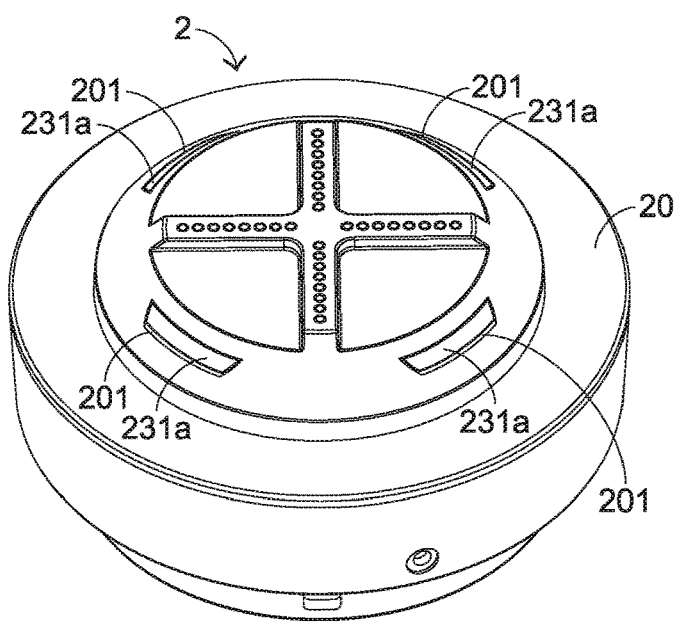
FIG. 5B is a schematic perspective view illustrating the base of the mobile electronic device fixing module, in which the plural rotary fixing slices are in a retracted state.

Please refer to FIGS. 5A and 5B. FIG. 5A is a schematic perspective view illustrating the base of the mobile electronic device fixing module, in which the plural rotary fixing slices 23 are in a protruded state. FIG. 5B is a schematic perspective view illustrating the base of the mobile electronic device fixing module, in which the plural rotary fixing slices 23 are in a retracted state. The inner structures of the base 2 and the ways of driving rotations of the rotating disc 22 and the rotary fixing slices 23 have been mentioned above. Two operating conditions of the base 2 are shown in FIGS. 5A and 5B, respectively. For achieving the locking and unlocking efficacy, the second parts 231b of all rotary fixing slices 23 are simultaneously in the protruded state, and the first prats 231a of all rotary fixing slices 23 are simultaneously in the retracted state.

Please refer to FIGS. 5A and 5B, and also refer to the relationship between the mobile electronic device 1 and the base 2 as shown in FIGS. 1A and 1B. After the base 2 is assembled with the assembling interface 12 and the rotary fixing slices 23 are rotated, the rotary fixing slices 23 are protruded out of the corresponding slots 201 and then inserted into the ring-shaped groove 13. Consequently, the rotary fixing slices 23 are in a locked state. For dismantling the base 2 from the assembling interface 12, the rotary fixing slices 23 are rotated reversely. The rotary fixing slices 23 are firstly removed from the ring-shaped groove 13, and then retracted back to the corresponding slots 201. Consequently, the rotary fixing slices 23 are in an unlocked state.

In a preferred embodiment, the base 2 is placed on the assembling interface 12 to result in the electric connection between the second transmission terminal group 25 and the first transmission terminal group 15, and then the subsequent driving action is performed. However, the way of dismantling the assembly of the base 2 and the assembling interface 12 is achieved through an application program. That is, a dismantling application program is installed in the mobile electronic device 1. After the application program is clicked and selected, the rotary fixing slices 23 are driven to be rotated and removed from the ring-shaped groove 13. Consequently, the rotary fixing slices 23 are in the unlocked state. Since the electric connection between the second transmission terminal group 25 and the first transmission terminal group 15 is maintained when the base 2 is assembled with the assembling interface 12, the dismantling information from the mobile electronic device 1 can be transmitted to the base 2. Consequently, the motor 31 is controlled to drive the rotating disc 22.

As long as the application program or the operation system of the mobile electronic device 1 is locked through a password, the connection between the mobile electronic device 1 and the base 2 cannot be unlocked. Consequently, the display and anti-theft purposes of the mobile electronic device can be effectively achieved.

The mobile electronic device fixing module of the present invention further comprises a protecting mechanism. The protecting mechanism is used for prompting the user to realize the assembling process or prompting the user to realize the special assembling condition. Consequently, the use life is prolonged, and the improper operations are avoided. In an embodiment, the indication unit 11 issues indication information to respond to the associated condition. For example, the indication information includes the flickering light, a long-termed light signal or a changed light color from of a light-emitting element.

If the rotary fixing slices 23 are rotated non-smoothly, the gear is jammed or the motor is over-loaded, the protecting mechanism allows the indication unit 11 to provide a changed light color or provide a flickering light at another frequency in order to indicate the abnormal condition. At the same time, the processing unit 19 or the processing unit 33 retracts back the rotary fixing slices 23. After the abnormal condition is eliminated, for example the assembling process is re-performed or the abnormal condition is gradually restored to the smooth condition, the processing unit 19 or the processing unit 33 drives the rotation of the rotary fixing slices 23 again. Even if the electric connection between the second transmission terminal group 25 and the first transmission terminal group 15 is established, the motor 31 is not certainly enabled. In other words, the timing of enabling the motor 31 depends on whether the abnormal condition is eliminated.

In the above embodiment, the vibration detector 18 and the processing unit 19 are installed on the mobile electronic device 1, and the motor 31 of the base 2 is driven through the electric connection between the second transmission terminal group 25 and the first transmission terminal group 15. It is noted that numerous modifications and alterations may be made while retaining the teachings of the invention. In another embodiment, the vibration detector is installed in the base 2. For example, the vibration detector is disposed on the second circuit board 30 or the base circuit board 26, and the processing unit 33 of the base 2 judges whether the motor 31 is enabled according to the detecting result of the vibration detector. Under this circumstance, the assembling process is feasible.

From the above descriptions, the present invention provides a mobile electronic device fixing module. The mobile electronic device fixing module provides a novel fixing mechanism or locking mechanism for the mobile electronic device and the base. Since the electric connection is established within the mobile electronic device and the base for transmitting signals and electric power, the transmission wire is no long in a mess during the electric connection. Moreover, an application program is executed to control the connection and the disconnection of the mobile electronic device and the base. Consequently, the display and anti-theft purposes of the mobile electronic device can be effectively achieved.

Since the mobile electronic device fixing module of the present invention is capable of solving the drawbacks of the conventional technologies, the mobile electronic device fixing module of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mobile electronic device fixing module, comprising:
   a mobile electronic device comprising an assembling interface and a first transmission terminal group, wherein a ring-shaped groove is formed in the assembling interface; and
   a base assembled with the assembling interface, wherein the base comprises plural rotary fixing slices and a second transmission terminal group corresponding to the first transmission terminal group,
   wherein when the base is assembled with the assembling interface and the plural rotary fixing slices are rotated, the plural rotary fixing slices are inserted into the ring-shaped groove to be in a locked state, or the plural rotary fixing slices are removed from the ring-shaped groove to be in an unlocked state, wherein when the base is assembled with the assembling interface, the second transmission terminal group is electrically connected with the first transmission terminal group, so that an electric connection between the base and the mobile electronic device is established.

2. The mobile electronic device fixing module according to claim 1, wherein the mobile electronic device further comprises a case and a first circuit board, the assembling interface is formed on the case, the first circuit board is disposed within the case and aligned with the assembling interface, the first transmission terminal group is disposed on the first circuit board, and the first transmission terminal group is disposed within the assembling interface.

3. The mobile electronic device fixing module according to claim 2, wherein the mobile electronic device further comprises:
   a vibration detector disposed on the first circuit board to detect vibration of the mobile electronic device; and
   a processing unit disposed on the first circuit board to drive rotation of the plural rotary fixing slices according to a detecting result of the vibration detector when the second transmission terminal group is electrically connected with the first transmission terminal group.

4. The mobile electronic device fixing module according to claim 1, wherein the mobile electronic device further comprises at least one first magnetic element, which is disposed within the assembling interface and aligned with the base, wherein while the base is assembled with the assembling interface, the base is magnetically attracted and fixed by the at least one first magnetic element.

5. The mobile electronic device fixing module according to claim 1, wherein the base further comprises at least one second magnetic element, which is aligned with the assembling interface, wherein while the base is assembled with the assembling interface, the assembling interface is magnetically attracted and fixed by the at least one second magnetic element.

6. The mobile electronic device fixing module according to claim 1, wherein the mobile electronic device further comprises an indication unit, and the indication unit generates an indication information according to a rotation state of the plural rotary fixing slices when the second transmission terminal group is electrically connected with the first transmission terminal group.

7. The mobile electronic device fixing module according to claim 1, wherein the base further comprises:
   a top cover, wherein the plural rotary fixing slices are pivotally coupled to an inner side of the top cover, and the second transmission terminal group is protruded outside the top cover;
   a motor connected with an external power source; and
   a rotating disc pivotally coupled to the top cover and linked with the motor, wherein the rotating disc is driven by the motor to be rotated in a first rotation direction or a second rotation direction, and the rotating disc is linked with the plural rotary fixing slices, wherein when the rotating disc is rotated in the first rotation direction or the second rotation direction, the plural rotary fixing slices are correspondingly rotated so as to be inserted into or removed from the ring-shaped groove.

8. The mobile electronic device fixing module according to claim 7, wherein the base further comprises:
   a second circuit board located at an inner side of the rotating disc;
   a vibration detector disposed on the second circuit board to detect vibration of the base; and
   a processing unit disposed on the second circuit board to drive rotation of the plural rotary fixing slices according to a detecting result of the vibration detector.

9. The mobile electronic device fixing module according to claim 7, wherein external electric power from the external power source is provided to the mobile electronic device through the base when the second transmission terminal group is electrically connected with the first transmission terminal group.

10. The mobile electronic device fixing module according to claim 7, characterized in that a first stopping structure and a second stopping structure are formed on the rotating disc to limit a rotating extent of the motor in the first rotation direction or the second rotation direction.

11. The mobile electronic device fixing module according to claim 7, characterized in that the top cover comprises plural slots corresponding to the plural rotary fixing slices, and the plural rotary fixing slices are selectively inserted into or removed from the ring-shaped groove through the plural slots.

12. The mobile electronic device fixing module according to claim 11, wherein each of the plural rotary fixing slices comprises:
   a first end pivotally coupled to the top cover;
   a shaft connected with the first end and aligned with a pivot center of the rotary fixing slice relative to the top cover; and
   a second end coaxially connected with the shaft and linked with the rotating disc,
   wherein a radius of gyration of a first part of the first end is shorter than or equal to a distance between the shaft and the corresponding slot, and the first part is not protruded out of the corresponding slot when the first part is rotated to the corresponding slot, wherein a radius of gyration of a second part of the first end is longer than or equal to the distance between the shaft and the corresponding slot, and the second part is protruded out of the corresponding slot when the second part is rotated to the corresponding slot.

13. The mobile electronic device fixing module according to claim 12, wherein an inner surface of the rotating disc and the second end of each rotary fixing slice have saw-toothed structures engaged with each other, so that the rotating disc and each rotary fixing slice are linked with each other.

14. The mobile electronic device fixing module according to claim 1, wherein an application program is installed in the mobile electronic device, wherein when the application program is executed to drive rotation of the plural rotary fixing slices, the plural rotary fixing slices are removed from the ring-shaped groove and in the unlocked state.

15. A mobile electronic device for a base having plural rotary fixing slices, the mobile electronic device comprises:

an assembling interface assembled with the base, wherein a ring-shaped groove is formed in the assembling interface; and a first transmission terminal group corresponding to a second transmission terminal group of the base, wherein when the base is assembled with the assembling interface and the plural rotary fixing slices are rotated, the plural rotary fixing slices are inserted into the ring-shaped groove to be in a locked state, or the plural rotary fixing slices are removed from the ring-shaped groove to be in an unlocked state, wherein when the base is assembled with the assembling interface, the second transmission terminal group is electrically connected with the first transmission terminal group, so that an electric connection between the base and the mobile electronic device is established.

16. A base for a mobile electronic device having a first transmission terminal group and an assembling interface, the assembling interface being assembled with the base, the base comprises:

plural rotary fixing slices; and a second transmission terminal group corresponding to the first transmission terminal group, wherein when the base is assembled with the assembling interface and the plural rotary fixing slices are rotated, the plural rotary fixing slices are inserted into the ring-shaped groove to be in a locked state, or the plural rotary fixing slices are removed from the ring-shaped groove to be in an unlocked state, wherein when the base is assembled with the assembling interface, the second transmission terminal group is electrically connected with the first transmission terminal group, so that an electric connection between the base and the mobile electronic device is established.

* * * * *